(12) United States Patent
Uchida

(10) Patent No.: US 11,002,892 B2
(45) Date of Patent: May 11, 2021

(54) DIFRACTION GRATING DISPLAY BODY AND LABELLED ARTICLE

(71) Applicant: TOPPAN PRINTING CO., LTD., Tokyo (JP)

(72) Inventor: Satoshi Uchida, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 170 days.

(21) Appl. No.: 16/164,554

(22) Filed: Oct. 18, 2018

(65) Prior Publication Data

US 2019/0049636 A1 Feb. 14, 2019

Related U.S. Application Data

(63) Continuation of application No. PCT/JP2017/016070, filed on Apr. 21, 2017.

(30) Foreign Application Priority Data

Apr. 22, 2016 (JP) .............................. JP2016-086487

(51) Int. Cl.
*G02B 5/18* (2006.01)
*B42D 25/328* (2014.01)
*G09F 3/02* (2006.01)

(52) U.S. Cl.
CPC .............. *G02B 5/18* (2013.01); *B42D 25/328* (2014.10); *G09F 3/02* (2013.01)

(58) Field of Classification Search
CPC ........ G02B 5/18; B42D 25/328; B42D 25/23; B42D 25/309; G09F 3/02
See application file for complete search history.

(56) References Cited

U.S. PATENT DOCUMENTS

| 5,784,200 A | * | 7/1998 | Modegi | ................ | G02B 5/1847 |
| | | | | | 359/2 |
| 2004/0032659 A1 | * | 2/2004 | Drinkwater | .......... | G02B 6/0051 |
| | | | | | 359/558 |

(Continued)

FOREIGN PATENT DOCUMENTS

| EP | 0 240 261 A2 | 10/1987 |
| EP | 2 336 823 A1 | 6/2011 |

(Continued)

OTHER PUBLICATIONS

Extended European Search Report dated Nov. 21, 2019 for corresponding Application No. 17786055.8.

(Continued)

*Primary Examiner* — Kimberly N. Kakalec
(74) *Attorney, Agent, or Firm* — Foley & Lardner LLP

(57) ABSTRACT

A diffraction grating display body includes: a plurality of cell sets each having a plurality of cell groups in which cells R, G, and B corresponding to red, green, and blue, respectively, in each pixel in a piece of color gradation image data, are arranged in a predetermined order, wherein the cells in the cell groups in at least one cell set among the plurality of cell sets have diffraction gratings with mutually different spatial frequencies and the same grating angle, the cell groups included in at least one cell set among the plurality of cell sets have diffraction gratings with mutually different grating angles among the cell groups, and each of the cells R, G, and B included in at least one cell set among the plurality of cell sets have a predetermined cell area so that the display body with a wide observation area is obtained.

9 Claims, 6 Drawing Sheets

(56) References Cited

U.S. PATENT DOCUMENTS

| | | | | |
|---|---|---|---|---|
| 2012/0127547 A1* | 5/2012 | Gocho | ................ | B42D 25/328 |
| | | | | 359/2 |
| 2012/0237731 A1 | 9/2012 | Boegli et al. | | |
| 2015/0042084 A1* | 2/2015 | Staub | ................... | B42D 25/328 |
| | | | | 283/91 |

FOREIGN PATENT DOCUMENTS

| | | |
|---|---|---|
| JP | H8-94815 A | 4/1996 |
| JP | 2004-280010 A | 10/2004 |
| JP | 5338177 B2 | 11/2013 |
| WO | WO-98/23979 A | 6/1998 |

OTHER PUBLICATIONS

International Search Report regarding PCT/JP2017/016070, dated Aug. 1, 2017, 2 pps.

\* cited by examiner

DIFFRACTION GRATING DISPLAY BODY AND LABELLED ARTICLE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2017/016070, filed on Apr. 21, 2017, which is based upon and claims the benefit of priority to Japanese Patent Application Nos. 2016-086487, filed on Apr. 22, 2016, the disclosures of which are all hereby incorporated herein by reference in their entireties.

TECHNICAL FIELD

The present invention relates to a diffraction grating display body and a labelled article to which a display technique for preventing counterfeiting is applied.

BACKGROUND

Background Art

Negotiable securities, cards, certificate documents, and the like are often provided with a display body having visual effects which are different from those of an ordinary printed matter so that they are not easily forged.

Examples of the display body using the conventional anti-counterfeiting technique include display bodies having a diffraction grating composed of a plurality of grooves. The diffraction grating creates spectral colors illuminating in rainbow colors, and the principles of the diffraction grating are described in, for example, "Holographic Display" written by Junpei Tsujiuchi (published by Sangyo Tosho Publishing Co., Ltd. in December 1990). When a display body having a diffraction grating is observed at a specific angle, only a specific wavelength is observed since light which is incident on a diffraction grating is dispersed according to the spatial frequencies of the diffraction grating.

There is a method called additive mixture, by which colors are represented by mixing three primary colors, red (R), green (G), and blue (B). The colors R, G, and B can be mixed at an appropriate ratio to represent a specific color. Further, a white color can also be represented by mixing R, G, and B. Various colors can be represented on TV or PC monitors by using this additive mixture method. Combinations of three colors or the degree of color mixture of light beams of three colors can be modified to adjust luminosity.

There are known display bodies for representing specific colors by using a diffraction grating and additive mixture (for example, see JP-A-H8-94815 or JP-A-H9-43594). In a display body including diffraction gratings with spatial frequencies corresponding to R, G, and B, light is dispersed by the respective diffraction gratings. The emitted diffracted light is different in angle depending on the wavelength. Accordingly, when observing a display body at a specific angle, an observer can recognize a specific color according to the degree of mixture of specific wavelengths emitted from the diffraction gratings of R, G, and B. By using this principle, a desired color image can be displayed by arranging diffraction gratings of R, G, and B in an appropriate manner.

Such diffraction grating display bodies can display a color image, and thus exhibit visual effects which are different from rainbow color images by the conventional diffraction gratings. Accordingly, due to high designability, higher anti-counterfeiting effects can be achieved.

SUMMARY OF THE INVENTION

Desired Advantageous Effects of the Invention

However, according to a diffraction grating display body that displays a color image by using diffraction gratings with spatial frequencies corresponding to R, G, and B, only a limited area of the display body itself is recognized as a color image when the display body is tilted in the horizontal direction viewed from an observer.

The present invention has been made to improve or even solve the above problem, and has an object of providing a diffraction grating display body and a labelled article having a large area that can be recognized as a color image, and having high visibility.

One aspect of the present invention is a diffraction grating display body that displays a color image by diffracting light, the diffraction grating display body including: a plurality of cell sets each having a plurality of cell groups in which cells R, G, and B corresponding to elements of red, green, and blue, respectively, in each pixel in a piece of color gradation image data, are arranged in a predetermined order, wherein the cells in the cell groups in at least one cell set among the plurality of cell sets have diffraction gratings with mutually different spatial frequencies and the same grating angle, the cell groups included in at least one cell set among the plurality of cell sets have diffraction gratings with mutually different grating angles among the cell groups, and each of the cells R, G, and B in the cell groups included in at least one cell set among the plurality of cell sets have a predetermined cell area.

According to the above aspect of the present invention, the display body includes a plurality of cell sets each having a plurality of cell groups in which cells R, G, and B corresponding to elements of red, green, and blue, respectively, in each pixel in a piece of color gradation image data, are arranged in a predetermined order, wherein the cells in the cell groups in at least one cell set among the plurality of cell sets have diffraction gratings with mutually different spatial frequencies and the same grating angle, the cell groups included in at least one cell set among the plurality of cell sets have diffraction gratings with mutually different grating angles among the cell groups, and each of the cells R, G, and B in the cell groups included in at least one cell set among the plurality of cell sets have a predetermined cell area. Accordingly, when the display body is observed at angles corresponding to the grating angles of the diffraction gratings in the respective cell groups while being tilted in the horizontal direction as viewed from an observer, a color image can be recognized at angles corresponding to the grating angles in the respective cell groups.

In the above aspect of the present invention, each of the element in each pixel in the color gradation image data is represented by 16 gradations or more and corresponds to the cell area of the cells R, G, and B.

According to the above aspect of the present invention, since each of the elements in each pixel in the color gradation image data is represented by 16 gradations or more and corresponds to the cell area of the cells R, G, and B, a color gradation rendering can be created on the display body.

In the above aspect of the present invention, the grating angles of the cells in the cell groups included in at least one cell set among the plurality of cell sets are different by 10° or less.

According to the above aspect of the present invention, the grating angles of the cells in the cell groups included in at least one cell set among the plurality of cell sets are different by 10° or less. Accordingly, the display body that can continuously display a color image when the display body is gradually tilted in the horizontal direction as viewed from an observer is provided.

In the above aspect of the present invention, the grating angles of the cells in the cell groups included in at least one cell set among the plurality of cell sets are different by more than 10°.

According to the above aspect of the present invention, the grating angles of the cells in the cell groups included in at least one cell set among the plurality of cell sets are different by more than 10°. Accordingly, when the display body is gradually tilted in the horizontal direction as viewed from an observer, a color image disappears as the display body is tilted, and appears as the display body is further tilted.

In the above aspect of the present invention, at least one diffraction grating used in the cell included in at least one cell group among the plurality of cell groups is formed of a blazed diffraction grating.

According to the above aspect of the present invention, the diffraction grating included in at least one cell group among the plurality of cell groups is formed of a blazed diffraction grating. Accordingly, a display body that ensures high diffraction efficiency so that the display image with high luminance can be easily recognized is provided.

In the above aspect of the present invention, the diffraction grating included in at least one cell group among the plurality of cell groups is formed of a rectangular diffraction grating or a sinusoidal diffraction grating, and the diffraction grating in at least one other cell group is formed of a blazed diffraction grating.

According to the above aspect of the present invention, a rectangular diffraction grating or a sinusoidal diffraction grating is provided as the diffraction grating included in at least one cell group among the plurality of cell groups, and a blazed diffraction grating is provided as the diffraction grating in at least one other cell group. Accordingly, the display body in which the diffracted light produced by the blazed diffraction grating observed at an observation angle corresponding to the blazed diffraction grating having any grating angle has a luminance, which is different from a luminance of the diffracted light produced by the rectangular diffraction grating or the sinusoidal diffraction grating observed at an observation angle corresponding to the rectangular diffraction grating or the sinusoidal diffraction grating having any grating angle is provided.

In the above aspect of the present invention, when a direction in which the color gradation image is observed is defined as a positive direction, an inclined surface of the blazed diffraction grating is oriented to the positive direction in the observation direction.

According to the above aspect of the present invention, an inclined surface of the blazed diffraction grating is oriented to the positive direction in the observation direction of the display body. Accordingly, when it is observed in a normal observation direction, a display body that ensures high diffraction efficiency so that the display image with high luminance can be easily recognized is provided.

In the above aspect of the present invention, a size of the cell group is 3 µm or more and 300 µm or less.

According to the above aspect of the present invention, a cell group having a size of 3 µm or more cannot be visually recognized, and a cell group having a size of 300 µm or less allows one or more gratings to be disposed in the cell group regardless of a grating angle.

Another aspect of the present invention is a labelled article including: the diffraction grating display body; and an article which supports the diffraction grating display body.

According to the present invention, the display body of the present invention can be attached or combined to articles such as negotiable securities, cards, and certification documents to thereby ensure high anti-counterfeiting effect for such articles.

DETAILED DESCRIPTION

Description of the Representative Embodiment

Figure 1:
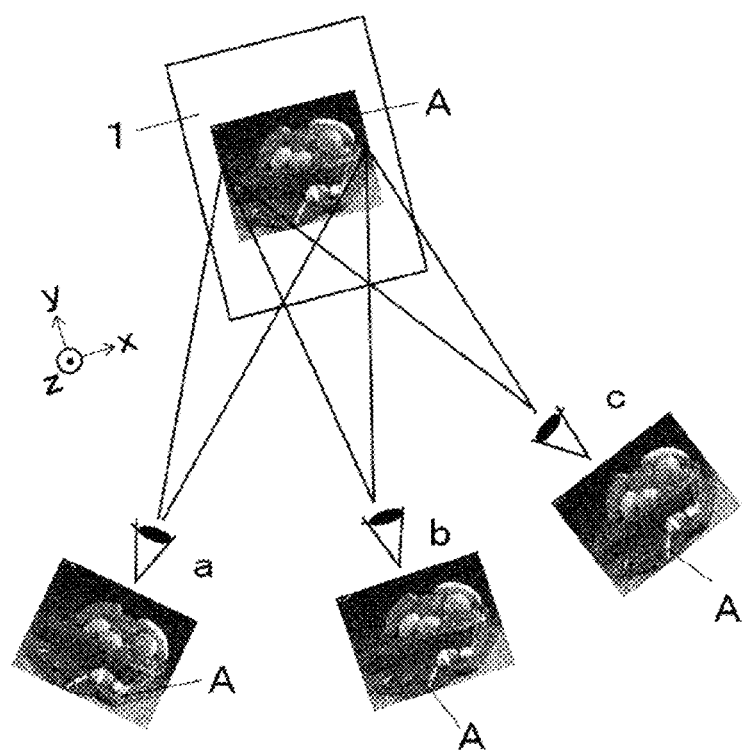
FIG. 1 is a view schematically illustrating an example of a display body 1 according to a first embodiment of the present invention with images showing how the display body 1 is seen when observed at a plurality of observation angles.

With reference to the drawings, an embodiment of the present invention will be described in detail. It is to be understood that the present invention is not limited to the following embodiment, which is intended to be representative of the present invention. The representative embodiment described below is merely an example of the present invention, and the design thereof could be appropriately changed by one skilled in the art. Incidentally, unless there is a reason for the sake of convenience, the same reference signs will be used for identical components, and redundant explanations will be omitted. It will be noted that in the drawings, like or corresponding parts are designated by like reference numerals and redundant illustrations therefor are omitted. The dimensional ratios in the drawings should not be construed as limited to those ratios shown therein.

Throughout all the drawings, components which have the same or similar functions are denoted by the same reference numerals, and duplicate descriptions are omitted.

(Description of Outline of Display Body)

FIG. 1 is a view schematically illustrating a display body 1 according to an embodiment of the present invention with images showing how the display body 1 is seen when observed at a plurality of observation angles. As shown in FIG. 1, the display body 1 can be observed at a plurality of observation angles a, b, and c. The display body 1 is composed of a set of cells formed of diffraction gratings. The observation angles a, b, and c are different from each other, corresponding to the grating angles of the diffraction gratings formed in the cells. When the display body 1 is observed at a specific observation angle, the image displayed on the display body 1 corresponds to a color gradation of an original image and is displayed by color gradation.

Figure 2A:
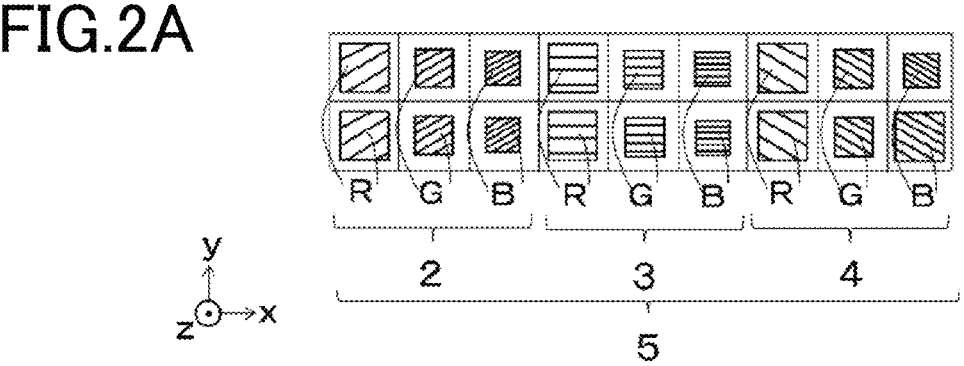
FIG. 2A is an enlarged plan view which illustrates a portion of the display body 1.

In an enlarged view of a detail of the picture A of the display body 1, a plurality of cell structures arranged in a predetermined order as shown in FIG. 2A are observed. As shown in FIG. 2A, in these cells, a cell group 2 composed of diffraction gratings of three spatial frequencies, red (R), green (G), and blue (B), which are equal in grating angle, is disposed. The cell group 2, together with a cell group 3 and a cell group 4, which are different from each other in grating angle, constitutes a cell set 5.

In the cell set 5, the cells corresponding to each of the elements R, G, and B have a predetermined cell size (cell area) throughout the cell group 2, the cell group 3, and the cell group 4. Thus, providing a predetermined cell size throughout the cell groups ensures the display body 1 to be recognized as a color gradation image of the same color regardless of angles at which the display body 1 is observed. The upper limit of the cell size (cell area) is a dot size corresponding the maximum luminance in each cell so that the luminance is adjusted by adjusting a cell size (cell area) within the range of the dot size.

Figure 2B:
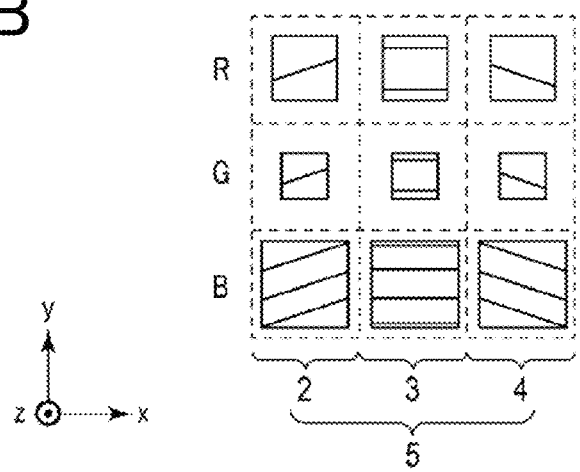
FIG. 2B is an enlarged plan view which illustrates a portion of another example of the display body 1.

The pixel arrangement in the cell structure is not limited to that shown in FIG. 2A. For example, FIG. 2B is an enlarged plan view which illustrates a portion of another example of the display body 1. As shown in FIG. 2B, the cell structure can be arranged in an orientation different from FIG. 2A. As shown in FIG. 2B, in these cells, a cell group 2 composed of diffraction gratings of three spatial frequencies, red (R), green (G), and blue (B), which are equal in grating angle, is disposed. The cell group 2, together with a cell group 3 and a cell group 4, which are different from each other in grating angle, constitutes a cell set 5.

In the cell set 5 of FIG. 2B as well, the cells corresponding to each of the elements R, G, and B have a predetermined cell size (cell area) throughout the cell group 2, the cell group 3, and the cell group 4. In FIG. 2B, the arrangement direction of R, G, and B cells and the arrangement direction of cell groups are the same. Further, the arrangement direction is perpendicular to the top and bottom direction of the picture displayed on the display body. When the pixels have a square shape, a groove direction of the diffraction grating in the respective cells is the x direction of the cell. The cells have reduced width in the x direction, but are widened in the direction of spatial frequency of diffraction grating (wave vector direction). Accordingly, even if the cell number in pixel increases, the cell is not narrowed in the spatial frequency direction, and thus the saturation of diffracted light does not decrease. On the other hand, when the cell is narrowed in the spatial frequency direction, saturation of diffracted light occurs due to diffusion occurring in the direction of wavelength dispersion of the diffracted light by the cell structure.

Figure 2C:
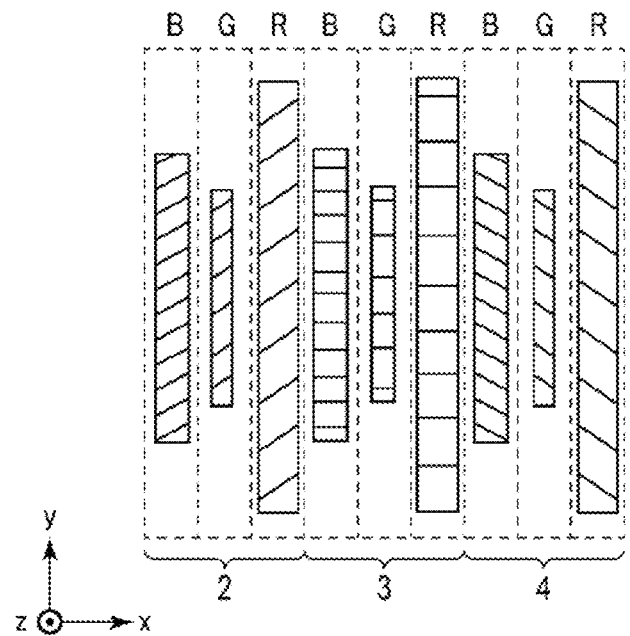
FIG. 2C is an enlarged plan view which illustrates a portion of another example of the display body 1.

Further, FIG. 2C is an enlarged plan view which illustrates a portion of yet another example of the display body 1. Unlike the cell structure of FIG. 2A, the cell structure composed of vertically long cells as shown in FIG. 2C can be used. As shown in FIG. 2C, in these cells, a cell group 2 composed of diffraction gratings of three spatial frequencies, red (R), green (G), and blue (B), which are equal in grating angle, is disposed. The cell group 2, together with a cell group 3 and a cell group 4, which are different from each other in grating angle, constitutes a cell set 5.

In the cell set 5 of FIG. 2C as well, the cells corresponding to each of the elements R, G, and B have a predetermined cell size (cell area) throughout the cell group 2, the cell group 3, and the cell group 4. Thus, providing a predetermined cell size throughout the cell groups ensures the display body 1 to be recognized as a color gradation image of the same color regardless of angles at which the display body 1 is observed. In addition, the cell size (cell area) can be adjusted by increasing or decreasing in the y direction as well as by increasing or decreasing in the x direction. That is, elements having different cell sizes (cell areas) are included in a diffraction grating display body. In particular, elements having different cell sizes (cell areas) in two directions (x, y) are included. Alternatively, cells having different sizes but the same ratio in the x direction and the y direction can be included.

(Description of Diffraction Grating)

Figure 3:
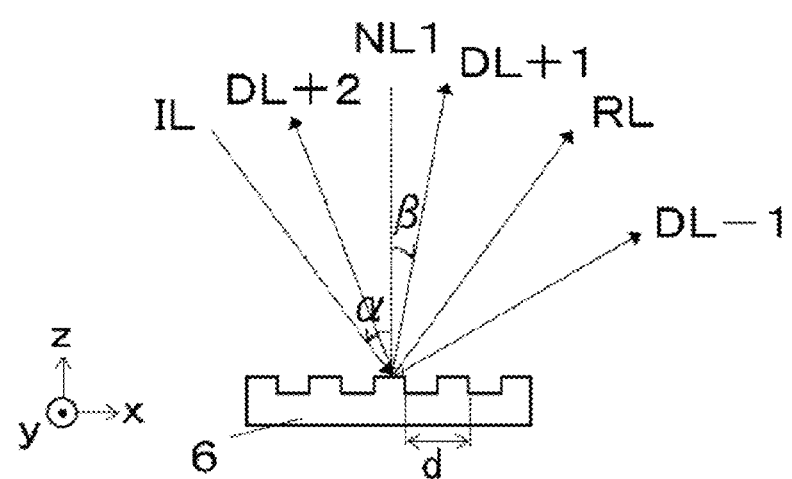
FIG. 3 is a view schematically illustrating how a rectangular diffraction grating emits diffracted light.

Next, a diffraction grating in the display body 1 required for displaying a color image will be described. Here, a rectangular diffraction grating 6 with grooves having a rectangular cross-sectional shape as shown in FIG. 3 will be described as a typical diffraction grating. In the respective cells, the diffraction gratings are preferably arranged in a predetermined direction and with a predetermined spatial frequency. Further, the spatial frequency of the diffraction grating may be distributed in a predetermined manner in the cell. That is, the mean value and the dispersion value of the spatial frequency in the cell are constant. When the diffraction gratings of the cells are irradiated with illumination light IL by use of an illumination light source, the diffraction grating emits strong diffracted light in a specific direction according to a traveling direction of the illumination light IL, which is incident light.

When the incident angle of the illumination light is α and the exit angle of the diffracted light is β, the m order (m=0, 1, 2 . . . ) diffracted light can be calculated by the following formula (1).

$$d = m\lambda / (\sin \alpha - \sin \beta) \quad (1)$$

In the formula (1), $\lambda$ represents the wavelength of illumination light and diffracted light, and d represents the pitch of diffraction grating. FIG. 3 schematically illustrates that the incident light IL is incident on a rectangular diffraction grating 6, and specularly reflected light RL, +1st order diffracted light DL+1, −1st order diffracted light DL−1, and +2nd order diffracted light DL+2 are emitted from the rectangular diffraction grating 6.

Next, the relationship between the pitch of diffraction grating and the wavelength of illumination light and the angle of diffracted light in the exit direction of the diffracted light (diffraction efficiency) will be described.

The illumination light which is incident on the diffraction grating having the pitch d at the incident angle α causes the diffracted light to be emitted at the angle θ based on the formula (1). The light emission intensity of the wavelength λ that is, the diffraction efficiency varies depending on the pitch, height, or the like of the diffraction grating, and is derived from the formula (2).

$$\eta = (2/\pi)2 \sin 2\{(2\pi/\lambda)(r/\cos \alpha)\} \sin 2\{(\pi/d)L\} \quad (2)$$

where η is the diffraction efficiency (value ranging from 0 to 1), r is the height of diffraction grating, L is the grating width of diffraction grating, d is the pitch of grating line, a is the incident angle of illumination light, and λ is the wavelength of incident light and diffracted light. Note that, the formula (1) and the formula (2) are established for diffraction gratings formed by shallow rectangular grooves.

As obvious from the formula (2), the diffraction efficiency varies depending on the height r of diffraction grating and the pitch d of diffraction line, the incident angle a of incident light, and the wavelength λ. Further, the diffraction efficiency tends to gradually decrease with an increase of the diffraction order number m.

(Description of Color Image Display by RGB)

Figure 4:
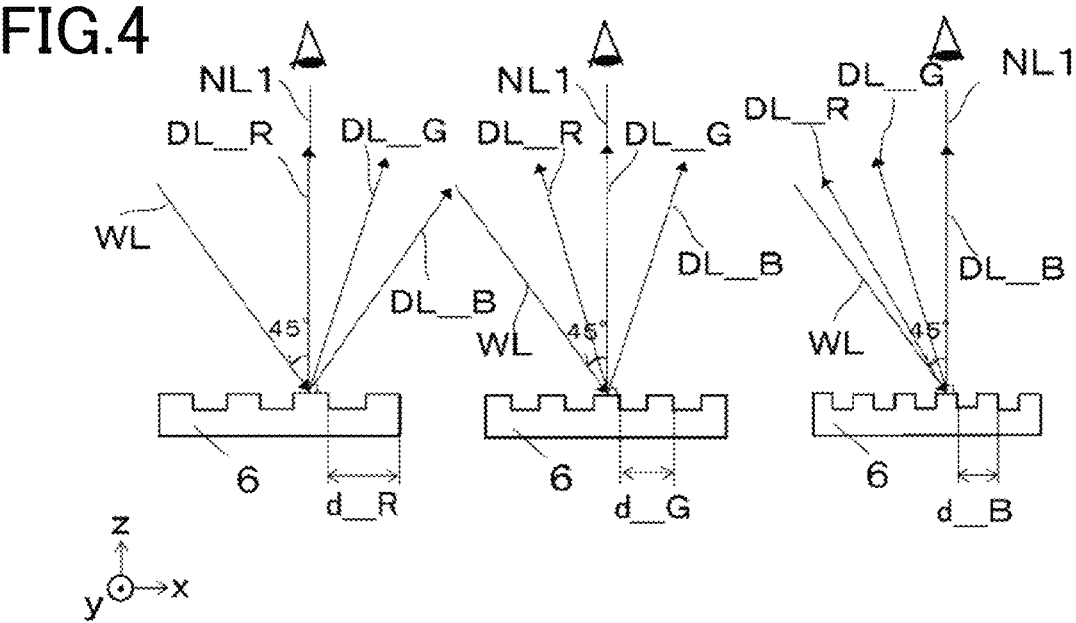
FIG. 4 is a view schematically illustrating how diffraction gratings with different spatial frequencies emit diffracted light.

As shown in FIG. 4, the spatial frequencies of three rectangular diffraction gratings 6, R, G, and B, used for the display body 1 are the number of lines that the wavelength of the +1st order diffracted light DL+1 corresponds to R, G, and B at 0 degree with a normal line NL1 taken as a reference in each of the rectangular diffraction gratings 6, when a white light WL is incident on the rectangular diffraction grating 6 at 45 degrees with respect to the normal line NL1, which is the axis vertical to the rectangular diffraction grating 6. For example, R=1000 lines/mm, G=1300 lines/mm, B=1600 lines/mm. When the display body 1 is observed at 40 degrees, the light beams of R, G, and B diffracted from the diffraction gratings of the respective spatial frequencies are mixed at a mixing ratio to represent a desired color.

The spatial frequencies of three rectangular diffraction grating 6, R, G, and B, are 700 lines/mm or more and 1100 lines/mm or less for R, 800 lines/mm or more and 1500 lines/mm or less for G, and 1100 lines/mm or more and 1800 lines/mm or less for B. As a matter of course, the spatial frequencies of R, G, and B are set to be R<G<B.

By varying the spatial frequency of the rectangular diffraction grating 6, specific wavelengths can be superposed at a position of observer's eye when the white light WL is incident on the diffraction grating of different spatial frequencies. By varying the intensity of the superposed light, a desired color can be observed.

As shown in FIG. 2A, the respective cells of R, G, and B are different in cell area corresponding to the R, G, and B gradations of the original color gradation image. Since the mixing ratio of the light beams R, G, and B can be modified by changing the cell area, a desired color expression can be realized. For example, since the respective elements of R, G, and B of the pixels of the original color gradation image data are represented by 256 gradations, the gradation of the color gradation data can be correlated to the cell area of the cells of R, G, and B corresponding to the respective elements so that 256×256×256=16,777,216 colors can be represented.

(Description of Layer Configuration and Producing Method)

Figure 5:
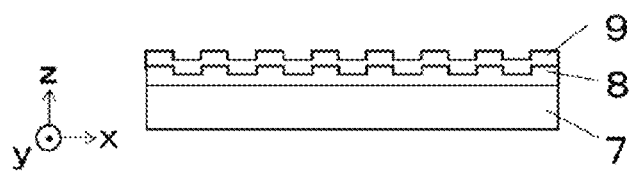
FIG. 5 is a cross-sectional view illustrating a layer configuration of the display body 1.

As shown in FIG. 5, one example of a layer configuration of the display body 1 is a substrate 7/light transmission layer (diffraction grating structure forming layer) 8/light reflection layer 9.

The material for the light transmission layer (diffraction grating structure forming layer) 8 may be a light transmissive resin such as a thermoplastic resin, a thermosetting resin, or a photocurable resin. By use of a thermoplastic resin, a thermosetting resin or a photocurable resin, the light transmission layer (diffraction grating structure forming layer) 8 on which the diffraction grating is formed can be formed on the light transmissive substrate 7 by transferring from the original plate on which a diffraction grating is formed.

The light transmission layer (diffraction grating structure forming layer) 8 may have a thickness of 1 μm or more and 10 μm or less. When the thickness is 1 μm or more, the diffraction grating has high formability. When the thickness is 10 μm or less, the light transmission layer (diffraction grating structure forming layer) 8 has high coating properties.

Further, the diffraction grating may have a depth of 0.05 μm or more and 0.5 μm or less. With this range of depth, a sufficient diffracted light can be obtained.

The light transmissive substrate 7 is a film or a sheet that can be handled alone. The material for the film or sheet may be, for example, PET, polycarbonate (PC), or the like. The light transmission layer 8 is obtained by applying a thermoplastic resin, a thermosetting resin, or a UV curable resin on the light transmissive substrate 7, and then pressing the original plate on which the diffraction grating is formed against the surface on which the resin is applied to cure the resin. The light transmissive substrate 7 may have a thickness in the range from 18 μm to 150 μm. With this range of thickness, the diffraction grating has high formability and high processability in adhesion to a medium.

The light reflection layer 9 may be made of an inorganic material. The inorganic material may be a metal layer made of a metal material or an inorganic compound. The metal material may be aluminum, silver, gold, and alloys thereof. The inorganic compound may be a compound of semimetal such as Si, or a metal compound. The compound of semimetal may be SiO or the like. The metal compound may be, for example, ZnS and TiO2. The light reflection layer 9 may be formed by a vapor phase deposition method. The vapor phase deposition method may be vacuum vapor deposition, sputtering, or chemical vapor deposition. The light reflection layer 9 may be 30 nm thick or more and 300 nm thick or less.

The display body 1 may further include additional layers such as an adhesive layer and a resin layer. The adhesive layer is provided, for example, to cover the light reflection layer 9.

(Types of Diffraction Grating)

Various types of diffraction grating may be provided in the display body 1. While the aforementioned rectangular diffraction grating is a typical example, a sinusoidal diffraction grating may be used instead of the rectangular diffraction grating.

Further, the display body 1 may use a blazed diffraction grating as a diffraction grating having a shape different from the rectangular diffraction grating or sinusoidal diffraction grating.

(Description of Blazed Diffraction Grating)

Figure 6:
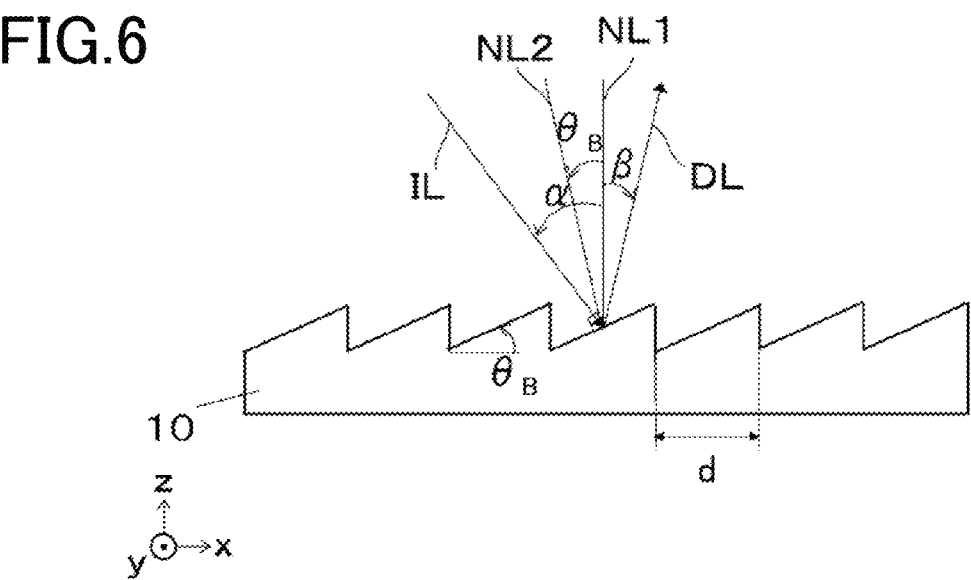
FIG. 6 is a view schematically illustrating how a blazed diffraction grating emits diffracted light.

As shown in FIG. 6, the blazed diffraction grating 10 has grooves having a serrated cross-sectional shape, and exhibits high diffraction efficiency for a specific order number and wavelength.

The relationship between the incident angle a and the diffraction angle θ for each wavelength in a blazed diffraction grating 10 can be calculated by the following formula (3).

$$\sin \alpha + \sin \beta = Nm\lambda \quad (3)$$

where λ is the wavelength of illumination light and diffracted light. The formula (3) shows the case where the illumination light IL is incident at the angle α with respect to the normal line NL1 of the diffraction grating and diffracts the angle β.

When the incident light and the m order diffracted light has the relationship of mirror reflection, energy is focused on the m order diffracted light. This diffraction angle β is referred to as a blazed angle θB, and is calculated by the following formula (4).

$$\theta B=(\alpha+\beta)/2 \quad (4)$$

Further, this wavelength is referred to as a blazed wavelength, and represented as λB. The blazed wavelength and the blazed angle can be calculated from the following formula (5) by substituting the formula (4) into the formula (3).

$$\lambda B=(2d/m)(\sin \theta B)\{\cos(\alpha-\theta B)\} \quad (5)$$

By varying the depth of the diffraction grating of different spatial frequencies, R, G, and B, the blazed angle θB of the respective diffraction gratings can be changed. By varying the blazed angle θB, light beams R, G, and B can be designed to have the blazed wavelength at an angle of 0 degree when the white light is incident at 45 degrees with respect to the normal line NL1 of the diffraction grating. For example, when the spatial frequencies R=1000 lines/mm, G=1300 lines/mm, and B=1600 lines/mm, which are the same as the rectangular diffraction grating described above, are applied to the diffraction gratings of R, G, and B, respectively, the blazed angles can be θBR=15.6 degrees, θBG=18.1 degrees, and θBB=21.7 degrees. Accordingly, the diffraction gratings of R, G, and B with the blazed wavelength of high diffraction efficiency emit the diffracted light of the wavelengths R, G, and B, respectively, so that an observer can observe a desired color.

(Grating Angle of Diffraction Grating)

As shown in FIG. 2A, the display body 1 includes the cell group 3 and the cell group 4 having diffraction gratings with grating angles different from the grating angle of the diffraction grating of the cell group 2, in which diffraction gratings have an equal grating angle.

For example, when the grating angle of the diffraction grating of a single cell group 3 is formed to be 0 degree, a color gradation image can be observed when observed from the front of the display body 1. Further, when the cell group 2 having the diffraction grating with the grating angle of +5 degree is provided in addition to the cell group having the diffraction grating with the grating angle of 0 degree, the color gradation image can be observed when the display body 1 is observed from the angle corresponding to the grating angle of +5 degree. Thus, by providing the cell group 2 and the cell group 3 with a difference in grating angle of not more than 10°, the observer does not recognize a difference in luminance when observing the display body 1 tilted in a horizontal direction although the observed luminance is actually different depending on the observation angle. That is, a wide viewing range is ensured for the observer observing the display body 1.

Further, for example, when a cell group having diffraction gratings with two types of grating angles is provided by providing the diffraction grating of the cell group 2 having the grating angle of +30 degrees in the cell group 3 of the display body 1 in addition to the diffraction grating with the grating angle of 0 degree, the observer can observe the color gradation image when observing the display body 1 from the observation angle corresponding to the grating angle of 0 degree and the grating angle of +30 degrees. On the other hand, it is difficult to observe the color image of the display body when observing from the observation angle corresponding to the grating angle of +15 degrees, which is the angle between the grating angle of 0 degree and the grating angle of +30 degrees.

Further, for example, when the cell group 3 having the grating angle of +5 degrees and the grating angle of −5 degrees is provided in the display body 1 in addition to the cell group having the diffraction grating with the grating angle of 0 degree, a viewing range horizontally symmetrical about the center of observation angle corresponding to the grating angle of 0 degree can be provided for the observer. When an authenticity determination of the display body 1 is performed, the observer usually observes the display body 1 from the front, and then observes by tilting it horizontally. Accordingly, the horizontally symmetrical viewing range enhances the visibility of the color image of the display body 1 for the observer.

(Combination of Different Types of Diffraction Gratings)

As shown by the formula (2) and the formula (5), the diffraction efficiency of the diffraction grating varies depending on the different type of diffraction grating. Further, the diffraction efficiency of the same type of diffraction grating also varies depending on the shape of diffraction grating such as a grating height and an approximation accuracy of blazed diffraction grating.

Figure 7:
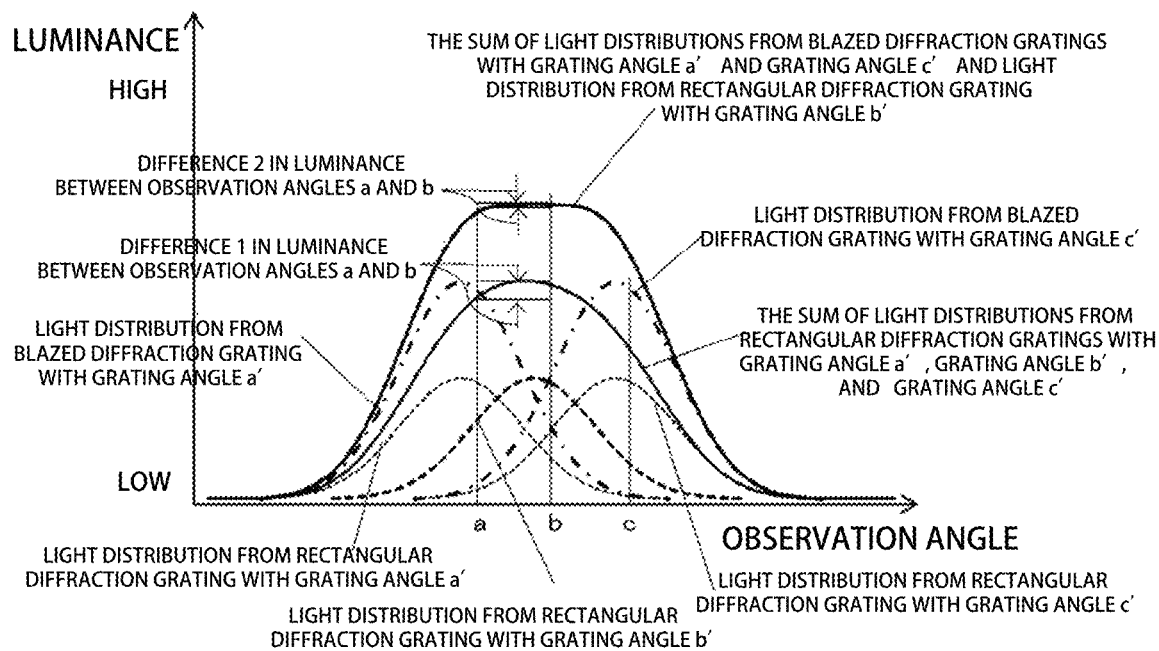
FIG. 7 is a view illustrating an example of a relationship between the luminance of light emitted from a diffraction grating disposed in the display body 1 and the observation angle.

It is assumed that all the diffraction gratings of the grating angles a', b', and c' provided in the cell group 2, the cell group 3, and the cell group 4 of FIG. 2A are the same rectangular diffraction grating regardless of the grating angle. As shown in FIG. 7, the rectangular diffraction gratings with different grating angles a', b', and c' each have light distribution on the basis of the observation angles a, b, and c. The sum of the light distribution observed at the rectangular diffraction grating having different grating angles is the observation luminance at a specific observation angle.

For example, it is assumed that the grating angles of the rectangular diffraction gratings are a', b', and c'. In this case, while the diffracted light from the rectangular diffraction grating with the observation angle b' most contributes to the observer at the observation angle b, the diffracted light from the rectangular diffraction grating with the grating angles a' and c' are also observed. The case of the observation angle c is considered below. In this case, for a luminance of light observed by the observer, the diffracted light from the rectangular diffraction grating with the observation angle c' most contributes to the observed light. Further, the diffracted light from the diffraction grating with the observation angle b' is also observed. On the other hand, the diffracted light from the grating angle a' has little contribution. Accordingly, the luminance of light observed at the observation angle α is lower than the luminance of light observed at the observation angle b.

Further, in the display body 1, the diffraction gratings having several types of shapes described above may be combined. As an example, the rectangular diffraction grating and the blazed diffraction grating may be combined.

For example, a rectangular diffraction grating is used for the diffraction grating of the grating angle b', and a blazed diffraction grating is used for the diffraction grating of the grating angle a' and the diffraction grating of the grating angle c'. At the observation angle b, the sum of the diffracted light from the rectangular diffraction grating with the grating angle b', the diffracted light from the blazed diffraction grating with the grating angle a' and the diffracted light from the blazed diffraction grating with grating angle c' is observed. On the other hand, at the observation angle a, the sum of the diffracted light from the rectangular diffraction grating with the grating angle b', and the diffracted light from the blazed diffraction grating of the grating angle a' is observed. Since the diffracted light from the blazed diffraction grating has a luminance higher than that of the diffracted light from the rectangular diffraction grating due to the characteristic of the diffraction grating, only the sum of the diffracted light from the blazed diffraction grating with the grating angle a' and the rectangular diffraction grating with the grating angle b is observed at the observation angle a. However, a luminance may be approximately the same as that of the diffracted light observed at the observation angle b. With this arrangement of the rectangular diffraction gratings and the blazed diffraction gratings, the display body providing the observation luminance that has a small observation angle dependency in the viewing range of the observer can be achieved.

(Combination with Other Structures)

Figure 8:
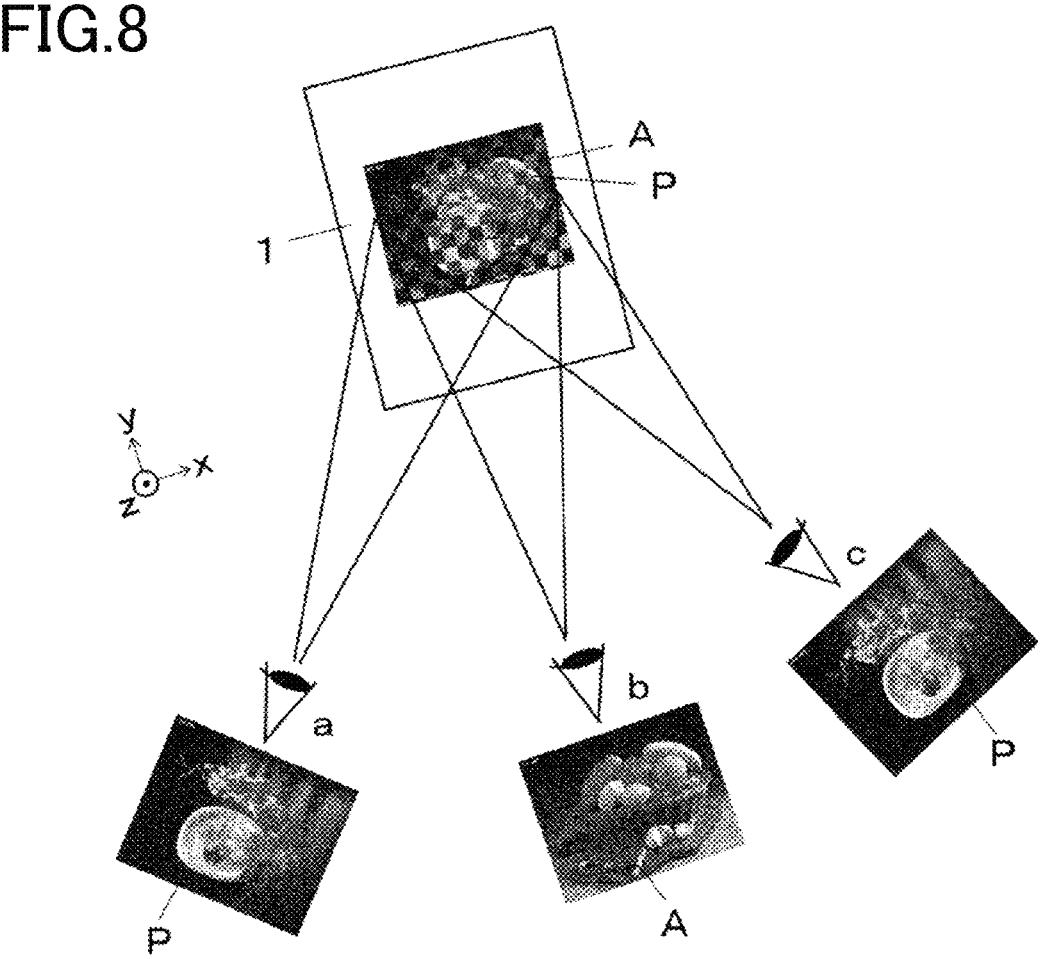
FIG. 8 is a view schematically illustrating an example of a display body 1 including a picture A and a picture P and how the display body 1 is seen.

Further, as shown in FIG. 8, the display body 1 can be configured to show different images depending on the grating angle of the diffraction grating disposed in the display body 1 when the display body 1 is tilted in the horizontal direction. As shown in FIG. 8, the picture A can be observed from the observation angle b, and the picture P can be observed from the observation angle a and the observation angle c. As described above, by displaying a plurality of images by the display body 1, an eye-catching effect of the display body 1 can be enhanced.

EXAMPLES

Since an adhesive layer can be provided in the display body 1, it can be adhered to a printed matter or card for use as an anti-counterfeit label.

For example, in the layers of the display body 1 shown in FIG. 5, PET is used for the substrate 7, and a thermoplastic resin is used for the light transmission layer. Further, an aluminum layer is provided as the light reflection layer, and an adhesive layer is further provided. This adhesive layer is used to support the display body 1 on an article.

The display body 1 itself cannot be easily forged or copied. Accordingly, when the anti-counterfeit label including the display body 1 is supported by an article, the article with the anti-counterfeit label, which is a genuine product, cannot be easily forged or copied.

Further, since the display body 1 displays a color image, high designability can be achieved and thus an eye-catching effect of the display body 1 can be enhanced.

INDUSTRIAL APPLICABILITY

According to the present invention, when the display body is observed at angles corresponding to the grating angles of the diffraction gratings in the respective cell groups while being tilted in the horizontal direction as viewed from an observer, a color image can be recognized at angles corresponding to the grating angles in the respective cell groups. The diffraction grating display body and the labelled article can be obtained.

What is claimed is:

1. A diffraction grating display body that displays a color image by diffracting light, comprising:
    a plurality of cell sets each having a plurality of cell groups in which cells R, G, and B corresponding to elements of red, green, and blue, respectively, in each pixel in a piece of color gradation image data, are arranged in a predetermined order,
    wherein the cells in the cell groups in at least one cell set among the plurality of cell sets have first diffraction gratings with mutually different spatial frequencies and the same grating angle,
    wherein the cell groups included in the plurality of cell sets have second diffraction gratings with mutually different grating angles among the cell groups,
    wherein each of the cells R, G, and B in the cell groups included in the plurality of cell sets have a predetermined cell area, and
    wherein the second diffraction gratings comprise a first blazed diffraction grating having a first grating angle and a first diffraction rectangular or sinusoidal grating having a second grating angle, which is different from the first grating angle.

2. The diffraction grating display body of claim 1, wherein each of the element in each pixel in the color gradation image data is represented by 16 gradations or more and corresponds to the cell area of the cells R, G, and B.

3. The diffraction grating display body of claim 1, wherein the grating angles of the cells in the cell groups included in at least one cell set among the plurality of cell sets are different by 10° or less.

4. The diffraction grating display body of claim 1, wherein the grating angles of the cells in the cell groups included in at least one cell set among the plurality of cell sets are different by more than 10°.

5. The diffraction grating display body of claim 1, wherein, when a direction in which the color gradation image is observed is defined as a positive direction, an inclined surface of the blazed diffraction grating is oriented to the positive direction in the observation direction.

6. The diffraction grating display body of claim 1, wherein a size of the cell group is 3 μm or more and 300 μm or less.

7. A labelled article comprising:
    the diffraction grating display body of claim 1, and
    an article which supports the diffraction grating display body.

8. The diffraction grating display body of claim 1, wherein the second gratings further comprise a second blazed diffraction grating having a third grating angle, which is different from both the first grating angle and the second grating angle.

9. The diffraction grating display body of claim 1, wherein the body comprises a substrate, a transparent diffraction structure forming layer and a light reflection layer.

* * * * *